Patented Oct. 3, 1939

2,174,807

UNITED STATES PATENT OFFICE 2,174,807

BREAD MAKING

Clotilde Swartout, North Muskegon, Mich.

No Drawing. Application August 9, 1937,
Serial No. 158,141

8 Claims. (Cl. 99—90)

This invention relates to bread making and more particularly to a simplified process of making raised bread and the compound from which the bread is made; and constitutes an improvement over my previously filed application Serial No. 12,909, filed March 25, 1935, now abandoned.

Customarily bread is made from a mixture containing principally flour and some other ingredients including yeast and milk or water. The ingredients are mixed as needed and the dough is set away to rise. Rising or expanding of the dough is caused by action of the yeast which ferments and develops carbon dioxide gas in the dough mixture. The yeast, which is similar to a plant in growth, consists of a multitude of yeast buds. These yeast buds are closely clustered together and when introduced into the dough mixture, as in the ordinary method pursued by the baker of breads, these clusters are widely separated throughout the dough mass in various isolated clumps of yeast buds distributed throughout the mass of dough, which to the layman and to the human eye would seem to thoroughly and intimately disseminate the yeast throughout the mass of dough which, because of the size of the yeast grains and the small quantity required, is impossible; but the yeast buds formed by the fermentation of the yeast are of infinitesimal size and their tendency is to cling closely together in clumps and in spite of the attempted mixture of the yeast through the mass of dough by the usual methods employed these clumps of buds will persist in clinging together.

When these buds grow during fermentation of the yeast, it results in each clump of yeast buds throwing off carbon dioxide gas in its immediate locality which results in isolated bubbles of the gas unevenly distributed throughout the dough. In order to break down these bubbles and distribute the gas uniformly through the dough so that the resulting bread will be of fine grained texture, the dough is submitted to a process of kneading.

When this kneading is done by hand, as in the home or by machinery as in small bakeries, it is a hard, long and tedious task which has been the dread of all breadmakers. Furthermore, the kneading process greatly retards the raising which has previously taken place in the dough and makes it necessary to again set the dough aside for further raising after which the dough is formed into regularly shaped portions and baked into bread.

It is an object of this invention to completely eliminate the kneading process and to provide a process which will result in raising the dough with an even texture and with the gas thrown off by fermentation of the yeast evenly and intimately distributed throughout the entire mass of dough, which absence of kneading also eliminates the set-back in rising caused thereby and greatly hastens the ultimate rising of the dough.

Another object of the invention is to provide a mixture of flour and other ingredients including yeast in finely divided form which may be packaged and distributed to stores for sale and which will keep without spoiling under ordinary atmospheric conditions for an indefinite length of time and permit its distribution, sale and use, such a mixture containing all of the ingredients which are necessary to make bread by the process of this invention excepting water.

The invention is hereafter more fully described and particularly pointed out in the claims.

It is intended that this invention be used commercially and for that purpose the ingredients are intended to be packaged in packages containing the right quantities and proportions to make a predetermined batch of bread. The mixture for making the usual household quantity of bread includes approximately 750 grams of flour, but this quantity of flour is divided into two portions, one of which contains 600 grams. The second portion, in which the other ingredients are mixed, contains 150 grams of flour, 15 grams of dry pulverized milk, 15 grams of powdered salt, 45 grams of granulated sugar and 15 grams of pulverized yeast. The yeast may be either that which is known as dry yeast pulverized or it may be dried compressed yeast. The difference in the result between different kinds of yeast is merely that one kind will act more quickly than another. It is desirable that all of the ingredients be in powdered form, but the yeast especially must be finely pulverized.

The exact proportions of dry milk, salt and sugar are not of great importance inasmuch as they are flavoring agents and small alteration of their exact proportions in the dough merely results in differing the flavor of the bread.

In making a batch of bread according to my invention, the smaller portion which is the contents of one package, or that package which contains the smaller amount of flour and other ingredients including the pulverized yeast, is first mixed with approximately one pint of water, this being all of the liquid used. The mixture of this relatively large amount of water with the dry ingredients results in a mass of fluid having a pasty or tight batter consistency which is then thoroughly beaten for approximately two minutes. This beating may be done by hand or by what is known as the rotary beater or egg beater. The beating of this pasty fluid batter should be done violently as it thereby greatly agitates the mixture resulting in a thorough admixture of the various ingredients but especially it results in breaking down the yeast buds into small, finely divided clumps uniformly distributed thoroughly throughout the whole mixture. In the beating, care must be taken that the mixture is not beaten for a sufficient length of time to cause the mixture to stiffen, as a stiffening of the mixture would result in an undesirable quality of the finished bread. It has been determined that beating the mixture aproximately two minutes will suffice and give the desired result and will avoid the undesirable stiffening of the mixture, since the hand or egg beater will revolve approximately six or seven hundred times per minute in its usual operation.

After this mixture has been prepared, the contents of the second portion or of the other package, which is namely 600 grams of flour, is added to it and thoroughly mixed by conventional means which produces a stiff dough of proper bread making consistency. This dough is then set aside for a period of from three to four hours during which the yeast further ferments, causing the dough to rise. The rising period will vary in length, depending upon the quality of yeast which has been used, as well as the temperature and atmospheric conditions prevailing.

The rising of the dough in this process is unlike the ordinary method because the yeast buds had been so thoroughly and minutely separated and distributed throughout the mixture that in the fermentation the gas generated thereby is evenly and uniformly distributed in small minute bubbles throughout the entire dough and for that reason kneading the dough is not required and is eliminated. This elimination of kneading obviates the strenuous labor associated with it and also eliminates the retarding action on the raising of the dough and shortens the time required for the dough to rise to the desired consistency. After the first mixing of the ingredients, including both the violent agitation of the liquid, pasty mass and the addition of the flour to make a stiff dough, nothing more is done other than to permit the dough to rise, form it into desired shapes and bake it.

The mixture of ingredients heretofore described has included pulverized, dehydrated milk. Such milk in the mixture, while it produces a fine texture and adds to the flavor of the bread, together with the water may be substituted for by milk in liquid form. In other words, dehydrated milk may be omitted from the dry mixture and one pint of liquid milk may be used in place of one pint of water for making the semi-liquid batter mass to be beaten and agitated.

Having thus revealed my invention, I claim as new and desire to secure the following processes, or equivalents thereof, by Letters Patent of the United States:

1. The process of making bread which process consists of combining in the following ratios: 150 grams of flour, 15 grams of pulverized yeast, approximately 75 grams of dry powdered flavoring ingredients and one pint of liquid to produce a semi-liquid batter-like mixture, violently mixing and agitating said mixture and mixing with said mixture approximately 600 grams of flour to produce a stiff dough, permitting said dough to rise and thereafter baking the dough.

2. The process of making bread which process consists of combining in the following ratios: 150 grams of flour, 15 grams of pulverized yeast, approximately 75 grams of dry flavoring ingredients and one pint of liquid to produce a semi-liquid mixture, violently mixing and agitating said mixture for a maximum of two minutes, thereafter adding approximately 600 grams of flour to said mixture to produce a stiff dough, permitting said dough to rise and baking the dough.

3. The process of making bread which process consists in combining in the following ratios: 150 grams of flour, 15 grams of dehydrated, pulverized milk, 15 grams of powdered salt, 15 grams of pulverized yeast, 45 grams of granulated sugar and one pint of water, violently mixing and agitating said mixture, adding 600 grams of flour and mixing the same to produce a stiff dough, permitting said dough to rise and baking the dough.

4. The process of making bread which process consists in combining in the following approximate ratios: 150 grams of flour, 15 grams of dry milk, 15 grams of salt, 15 grams of pulverized yeast, 45 grams of sugar and one pint of water, violently mixing and agitating said mixture for a maximum of two minutes, adding approximately 600 grams of flour and mixing the same to produce a stiff dough, permitting said dough to rise and thereafter baking the dough.

5. The process of making bread which process consists in combining in the following approximate ratios: 150 grams of ground flour, 15 grams of dehydrated milk, 15 grams of salt, 15 grams of pulverized yeast, sugar and one pint of fresh water, violently mixing the said mixture for a maximum of two minutes, thereafter adding 600 grams of flour and mixing the same to produce a stiff dough, subjecting the said dough to a rising period and thereafter baking the dough.

6. The process of making bread which consists in the steps of mixing together the usual flavoring ingredients, pulverized yeast and water with approximately 20% of the total amount of flour used, thoroughly breaking up and distributing evenly all of the yeast buds so formed throughout the resulting batter, adding the other 80% of the flour to produce a stiff dough, permitting said dough to rise and baking the dough.

7. The process of making bread which consists in the steps of mixing together the usual flavoring ingredients, pulverized yeast and water with approximately 20% of the total amount of flour to form a batter, rotating a beater in said batter at the rate of not less than 600 R. P. M., adding the other 80% of said flour to produce a stiff dough, permitting said dough to rise and baking the dough.

8. The process of making bread which consists in the steps of mixing together the usual flavoring ingredients, pulverized yeast and water with approximately 20% of the total amount of flour to form a batter, rotating a beater therein at the rate of not less than 600 R. P. M. for substantially two minutes, adding the other 80% of said flour to produce a stiff dough, permitting said dough to rise and baking the dough.

CLOTILDE SWARTOUT.